(12) United States Patent
Yamane et al.

(10) Patent No.: US 7,445,836 B2
(45) Date of Patent: Nov. 4, 2008

(54) MOLDED PRODUCT OF FIBER REINFORCED COMPOSITE MATERIAL AND METHOD

(75) Inventors: Yasuo Yamane, Saitama (JP); Kazuhito Nakao, Saitama (JP); Satoshi Hirawaki, Saitama (JP); Kazumi Saito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 356 days.

(21) Appl. No.: 10/771,322

(22) Filed: Feb. 5, 2004

(65) Prior Publication Data

US 2004/0175533 A1 Sep. 9, 2004

(30) Foreign Application Priority Data

Mar. 3, 2003 (JP) .............................. 2003-055712

(51) Int. Cl.
*B32B 27/04* (2006.01)
(52) U.S. Cl. ...................... 428/297.4; 428/212; 428/168
(58) Field of Classification Search ................ 428/122, 428/161, 290, 297.4, 192, 212, 168
See application file for complete search history.

(56) References Cited

U.S. PATENT DOCUMENTS

| | | | |
|---|---|---|---|
| 3,903,343 A | | 9/1975 | Pfaff |
| 4,044,188 A | * | 8/1977 | Segal ........................ 428/297.4 |
| 4,051,290 A | * | 9/1977 | Jutte et al. ................... 428/168 |
| 4,255,752 A | * | 3/1981 | Noble et al. ................. 343/771 |
| 5,072,643 A | * | 12/1991 | Murata ......................... 84/293 |
| 5,667,335 A | * | 9/1997 | Khieu et al. ................... 404/14 |
| 6,190,481 B1 | * | 2/2001 | Iida et al. ..................... 156/175 |
| 6,228,473 B1 | * | 5/2001 | Takemura et al. ......... 428/295.1 |
| 6,706,371 B2 | * | 3/2004 | Lu .............................. 428/192 |

FOREIGN PATENT DOCUMENTS

| | | |
|---|---|---|
| JP | 50-16785 | 1/1993 |
| JP | 08-072186 | 3/1996 |
| JP | 08-258205 | 10/1996 |
| JP | 09-277420 | 10/1997 |
| JP | 10-044322 | 2/1998 |

* cited by examiner

*Primary Examiner*—N Edwards
(74) *Attorney, Agent, or Firm*—Arent Fox LLP

(57) ABSTRACT

A molded product of fiber reinforced composite material is provided, which includes a substantially flat portion and a shaping portion that is molded to be more complex in shape than the flat portion. The substantially flat portion has a first parent material and a reinforcing material made of long-fiber sheet, and the shaping portion has a second parent material and short fibers.

6 Claims, 5 Drawing Sheets

MOLDED PRODUCT OF FIBER REINFORCED COMPOSITE MATERIAL AND METHOD

BACKGROUND OF THE INVENTION

The present invention relates to a molded product of fiber reinforced composite material and its manufacturing method, and more particularly relates to a molded product having a substantially flat portion and the other portion more complex than the substantially flat portion.

A base material has been used, in which continuous fibers (hereinafter referred to as "long fibers") are uniformly spread, in order to reinforce a molded sheet product of Fiber Reinforced Plastics (FRP). The molded product of FRP is generally produced with a manufacturing method such as Resin Transfer Molding (RTM) in an autoclave. This manufacturing method has a merit that it can provide a product with high strength. However, it has a demerit that it requires a large amount of man-hours and a skilled worker because it is necessary to stack thin base materials on a mandrel so that they get to fit its contours.

In contrast to the above-mentioned methods, there is a method called Sheet Molding Compound (SMC), which has a merit that it requires neither a large amount of man-hours nor a skilled worker because the method does not include a process for fitting a base material to the mandrel. The method employs a base material, which includes chops of fibers (hereinafter referred to as "short fibers") cut to a couple of centimeters or spirally continuous fibers able to move freely. A molded product of SMC is cured under pressure and heat in a mandrel apparatus. Japanese Published Patent Application 8-72186 discloses an art related to this method.

The SMC method has a merit that a complicated shape can be relatively easily molded because the fluid base material made of short fibers is used. At the same time, the method has a demerit that it provides lower in-plane stiffness than that of a molded product using a long-fiber base material.

A molded sheet product usually has a reinforcing rib for increasing out-of-plane stiffness or a boss for its attachment to receiving structure. It has been discovered that conventional materials have the following problems.

A long-fiber base material having low fluidity does not allow integral molding of a flat portion with a rib or a boss. In order to overcome this difficulty, it is necessary not only to mold the rib and boss separately from the flat portion but also to attach them to each other with an adhesive. This undesirably requires an additional step of attachment. Although it may be possible to increase the thickness of the flat portion with additional layers of the long-fiber base material instead of the rib so as to increase its out-of-plane stiffness, it inevitably results in a large amount of man-hours because each layer needs to be manually stacked.

Using only a base material made of short fibers such as chops, which allows integral molding of a flat portion with a rib using SMC method, still poses the problem that in-plane stiffness tends to be lower than that of molding of a long-fiber base material.

SUMMARY OF THE INVENTION

According to an aspect of the present invention, a molded product of fiber reinforced composite material is provided, which includes a substantially flat portion and a shaping portion that is molded to be more complex in shape than the flat portion. The substantially flat portion has a first parent material and a reinforcing material made of long-fiber sheet, and the shaping portion has a second parent material and short fibers.

In this connection, the first and second parent materials are generally composed of the same mixture of materials, which includes a thermosetting resin mixed with a polymerization monomer, a shrinkage limiting agent, a thickener, a hardening agent and a filler. However, it is not limited to these parent materials but it may be possible to select a thermoplastic resin instead. In addition, as long as sufficient adhesion is provided between them, different materials may be applied to the first and second parent materials, respectively.

Although carbon fibers are preferable for the long and short fibers, it may be possible to alternatively select glass fibers or aramid fibers. The long fiber is formed like a sheet of plain weave or twill weave. The length of the short fiber is adapted to be about 30 mm, which allows the fiber to be fluid during molding. In this connection, it may be possible to arbitrarily select the length of short fiber, for example less than 1 mm.

The molded product of the present invention described above allows simultaneous molding of the flat and shaping portions at one step of manufacturing method such as SMC method, which conducts pressing and heating in a mandrel apparatus. The reason for this is that a sheet of long fibers forming the flat portion can accomplish high in-plane stiffness and the fluidity of short fibers can provide good molding for the shaping portion. This results in less man-hours and high stiffness in molding of the product.

According to another aspect of the present invention, a molded product of fiber reinforced composite material is provided, whose shaping portion is molded into a rib for reinforcing a substantially flat portion.

The molded product described above, in which the rib made of short fibers reinforces the flat portion, allows a decrease in the thickness of the flat portion.

According to still another aspect of the present invention, a method for manufacturing a molded product of fiber reinforced composite material is provided, which includes a substantially flat portion and a shaping portion that is molded to be more complex in shape than the flat portion. The method includes the steps of forming a long-fiber base material with a first parent material and a reinforcing material made of long-fiber sheet, forming a short-fiber base material with a second parent material and short fibers, placing the long-fiber base material on a first portion of a mandrel which is tailored for molding the substantially flat portion, placing the short-fiber base material on a second portion of the mandrel which is tailored for molding the shaping portion and conducting an operation of pressing and heating for the long-fiber and short-fiber base materials with the mandrel.

The method of the present invention described above, allows not only molding of the flat portion having high in-plane stiffness as a result of application of the long fibers but also providing more complex molding for the shaping portion as a result of the fluidity of the short-fiber base material. This results in not only less man-hours but also high stiffness in molding of the product.

According to yet another aspect of the present invention, a method for manufacturing a molded product of fiber reinforced composite material is provided, in which plural layers of long-fiber base material are stacked before being settled on a mandrel.

The method described above, in which the plural layers are stacked before they are settled on the mandrel, can shorten the production time of molded product because it is unnecessary to conduct a time-consuming stack operation on the mandrel where spatial restriction is imposed on it.

According to further aspect of the present invention, a method for manufacturing a molded product of fiber reinforced composite material is provided, in which plural layers of long-fiber base material are stacked with a short-fiber base material before being settled on a mandrel.

The method described above, in which the plural layers of long-fiber base material and the short-fiber base material are stacked to each other before they are settled on the mandrel, can shorten the production time of the molded product because it is unnecessary to conduct a time-consuming positioning operation on the mandrel.

DESCRIPTION OF THE PREFERRED EMBODIMENTS

An embodiment of the present invention is described with reference to the accompanying drawings.

Figure 1:
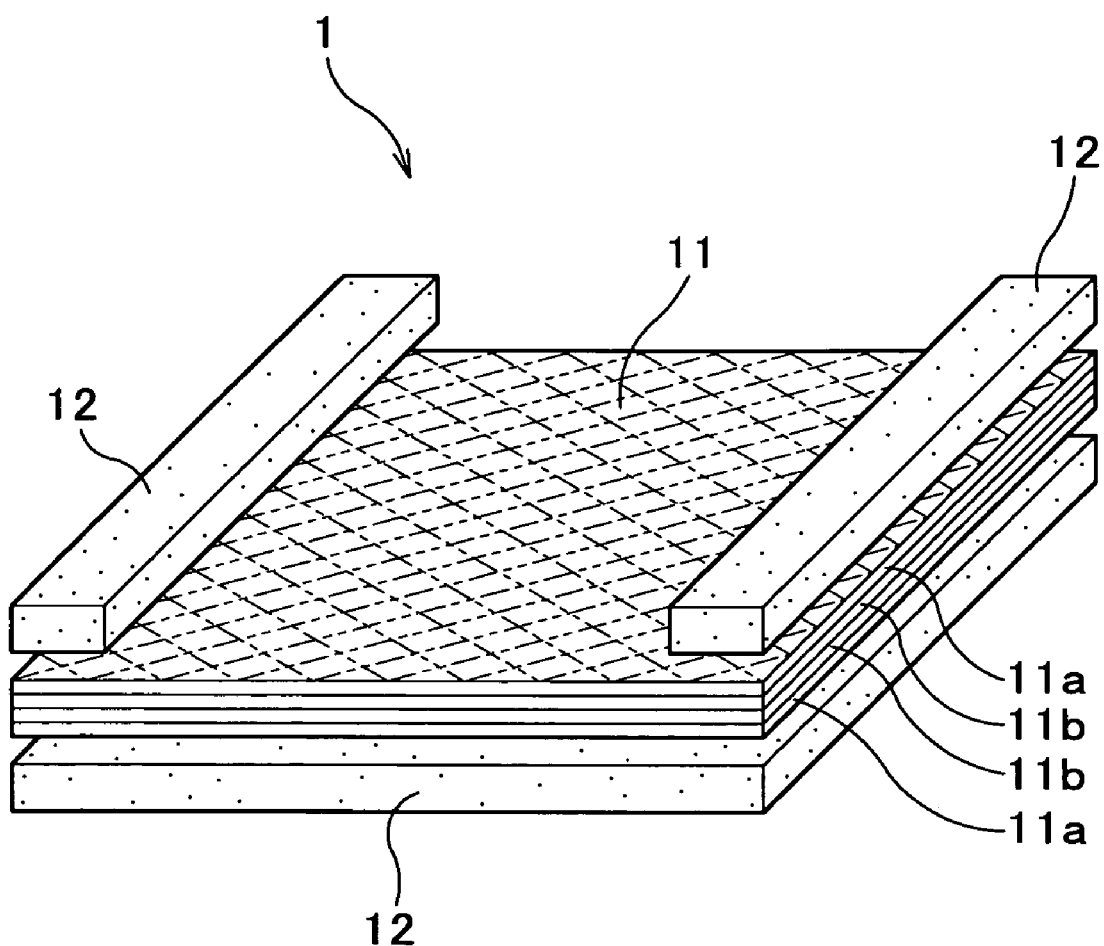
FIG. 1 is an exploded perspective view showing a carbon fiber reinforced composite material to be formed into a plate component according to the present invention.
Figure 2:
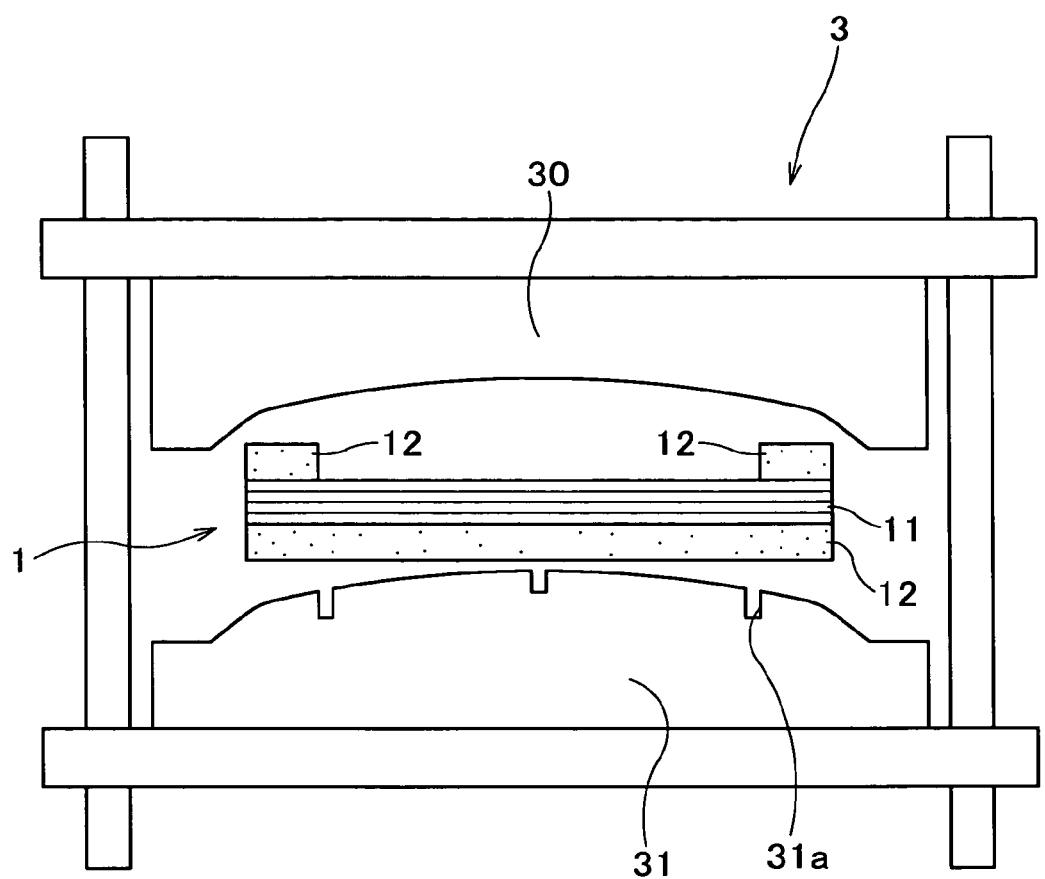
FIG. 2 is a side view showing a mandrel apparatus in which the carbon fiber reinforced composite material shown in FIG. 1 is settled.
Figure 3:
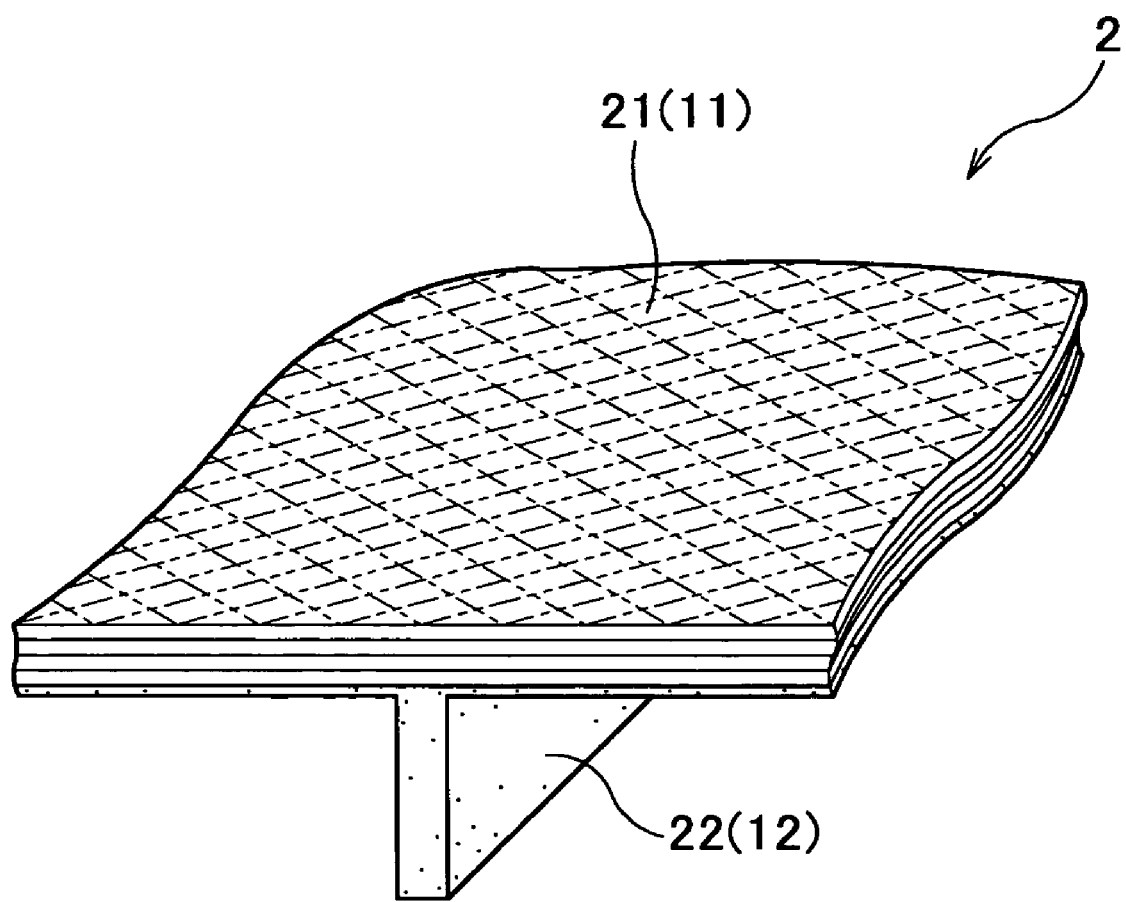
FIG. 3 is an enlarged perspective view showing major portions of a plate component formed with the carbon fiber reinforced composite material shown in FIG. 1.

A plate component 2 shown in FIG. 3 is made of a carbon fiber reinforced composite material 1 shown in FIG. 1. The carbon fiber reinforced composite material 1 includes a semi-finished long-fiber stack 11 and a short-fiber base material 12, which is made of a second parent material such as a thermosetting resin with a thickener and short fibers. As shown in FIG. 3, the semi-finished long-fiber stack 11, which forms a flat portion 21 in the plate component 2, has in a predetermined construction four layers of two types of long-fiber base materials 11a and 11b, which have fiber directions of –45 deg. and +45 deg., respectively. These long-fiber base materials 11a and 11b, which are made of a reinforcing material of long-fiber sheet impregnated with a first parent material such as a thermosetting resin mixed with a thickener, are bonded to each other with a fluid resin applied between them.

In this connection, it may be possible to flexibly select any other material for the long-fiber base materials 11a and 11b as long as it can increase its in-plane stiffness when it is cured under pressure and heat. Although the four layers of long-fiber base materials 11a and 11b are stacked and bonded to each other before they are carried into a mandrel apparatus 3, which includes upper and lower mandrels 30 and 31, it may be possible to stack and bond the long-fiber base materials 11a and 11b with the fluid resin in the mandrel apparatus 3 instead. It may also be possible to select any number of layers for the long-fiber base materials 11a and 11b.

As shown in FIG. 3, the short-fiber base material 12 forms shaping portions such as a rib 22 and a complex portion (not shown). In this way, short-fiber base materials 12 are placed both on the upper surface and under the lower surface of the semi-finished long-fiber stack 11 as shown in FIG. 1. The semi-finished long-fiber stack 11 and the short-fiber materials 12 are bonded with the fluid resin applied between them. In this connection, it may be possible to select any material for the short-fiber base materials 12 as long as it is categorized as a thermosetting resin, which has high fluidity while it is undergoing heating operation. It may also be possible to bond the short-fiber base materials 12, which are given stickiness before they are carried into the mandrel apparatus 3, to the semi-finished long-fiber stack 11 without the fluid resin.

A method for manufacturing a plate component 2 with a carbon fiber reinforced composite material 1 is described.

As shown in FIG. 1, four sheets of long-fiber base materials 11a and 11b are formed out of a first parent material and a reinforcing material of long-fiber sheet (Step 1). Short-fiber base materials 12 are formed out of a second parent material and short fibers (Step 2). The four sheets of long-fiber base materials 11a and 11b, two sheets respectively, are stacked and bonded to each other to make a semi-finished long-fiber stack 11 before they are carried into a mandrel apparatus 3, which includes upper and lower mandrels 30 and 31. The short fiber base materials 12, each of which serves as a shaping portion, are placed both on laterally distal portions of the upper surface and under the lower surface of the semi-finished long-fiber stack 11, as shown in FIG. 1. The short fiber base materials 12 are bonded to the semi-finished long-fiber stack 11 with a liquid resin. The carbon fiber reinforced composite material 1, which includes a stack of the semi-finished long-fiber stack 11 and the short-fiber base materials 12, is settled on a predetermined position in the mandrel apparatus 3 (Step 3). In this way, the carbon fiber reinforced composite material 1 is positioned so that the semi-finished long-fiber stack 11 sits on a predetermined portion in the mandrel apparatus 3 for forming a flat portion 21, and the short fiber base materials 12 for forming a rib 22 and a complex portion (not shown).

The semi-finished long-fiber stack 11 and the short-fiber base materials 12 undergo pressing and heating in the mandrel apparatus 3 in the similar manner as that of SMC method (Step 4). The short-fiber base materials 12 placed on the upper surface of the semi-finished long-fiber stack 11 are pressed, so that they are fluidly molded into complex shapes according to the contours of the upper mandrel 30. On the other hand, a short-fiber base material 12 placed under the lower surface of the semi-finished long-fiber stack 11 flows into grooves 31a formed in the lower mandrel 31 so that it is molded into a rib 22.

The carbon fiber reinforced composite material 1, which undergoes pressing and heating in the mandrel apparatus 3, is formed into the flat portion 21 having high in-plane stiffness and the complex portion as well as the rib 22, which are respectively integral with the flat portion 21 as shown in FIG. 3. In this way, the plate component 2 is molded, which includes both the flat potion 21 that requires high stiffness and the rib 22 as well as the complex portion that have more complicated shapes than that of the flat portion 21.

The present invention provides the following advantages.

It is possible to save time in forming the plate component 2 with high stiffness, which includes the flat portion 21, rib 22 and the complex portion. This results from the fact that the plate component 2 can be formed in one step of pressing and heating because the flat portion 21 is made of the semi-finished long-fiber stack 11 and the rib 22 as well as the complex portion are made of the short-fiber base materials 12.

It is possible to shorten the time period required for stacking the long-fiber base materials 11a and 11b. This is attributed to the fact that the number of layers for the long-fiber base materials 11a and 11b can be reduced because the flat portion 21, which is reinforced by the rib 22 made of a short-fiber base material 12, has higher stiffness.

The long-fiber base materials 11a and 11b, which are stacked before they are carried into the mandrel apparatus 3, allow a reduction in the period of time required for their manufacturing because it is unnecessary to do a time-consuming stacking operation in the mandrel apparatus 3 where spatial restriction is imposed on it.

It is possible to shorten the period of time for manufacturing the plate component 2 because it is not necessary to conduct a time-consuming setting operation for the semi-finished long-fiber stack 11 and the short-fiber base materials 12 in the mandrel apparatus 3, which are bonded to each other in advance.

EXAMPLE

Figure 4:
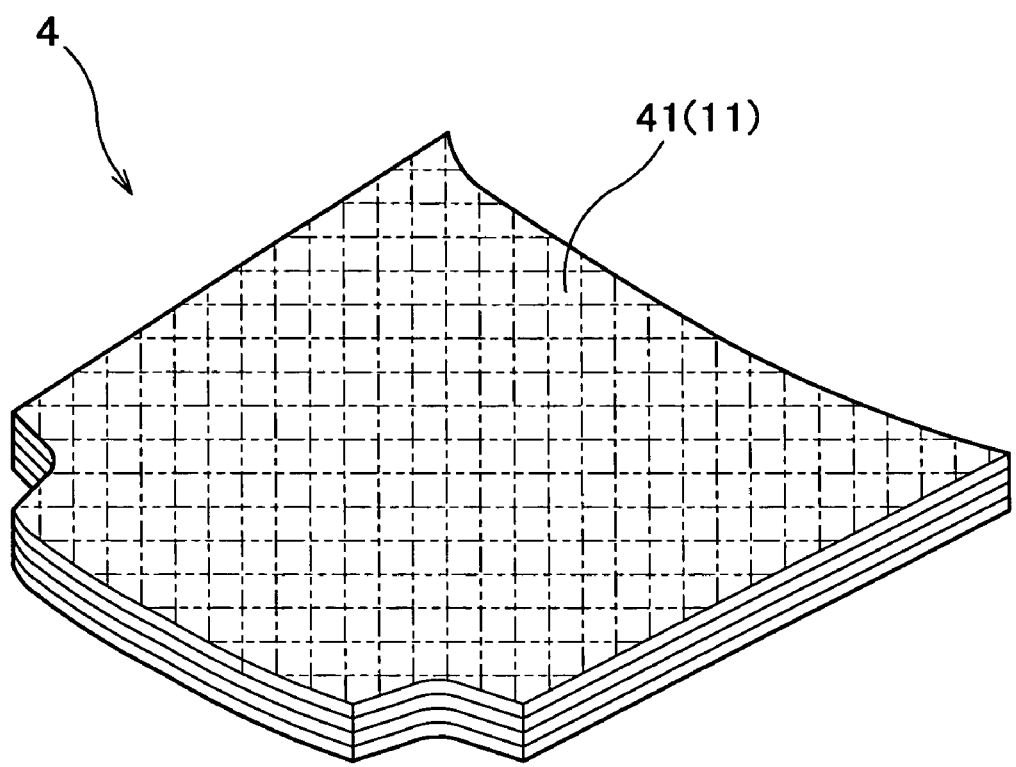
FIG. 4 is an exploded perspective view showing a hood of vehicle to which the carbon fiber reinforced composite material shown in FIG. 1 is applied.
Figure 4:
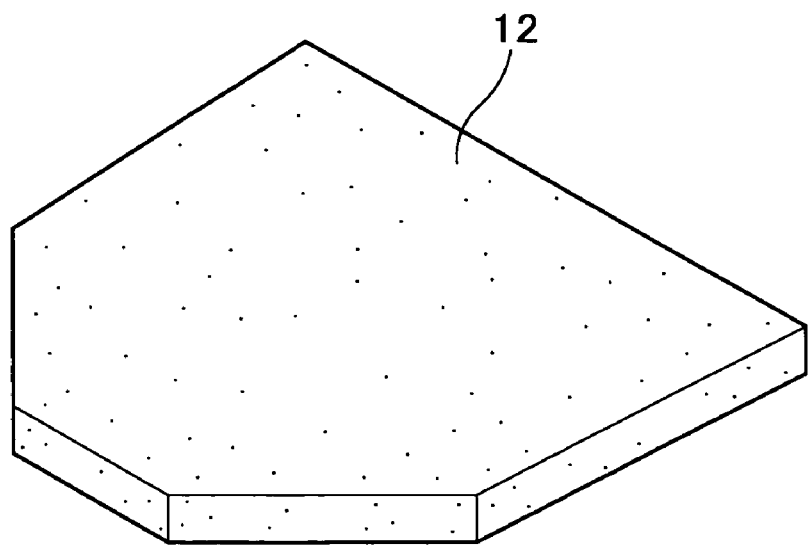
Figure 5:
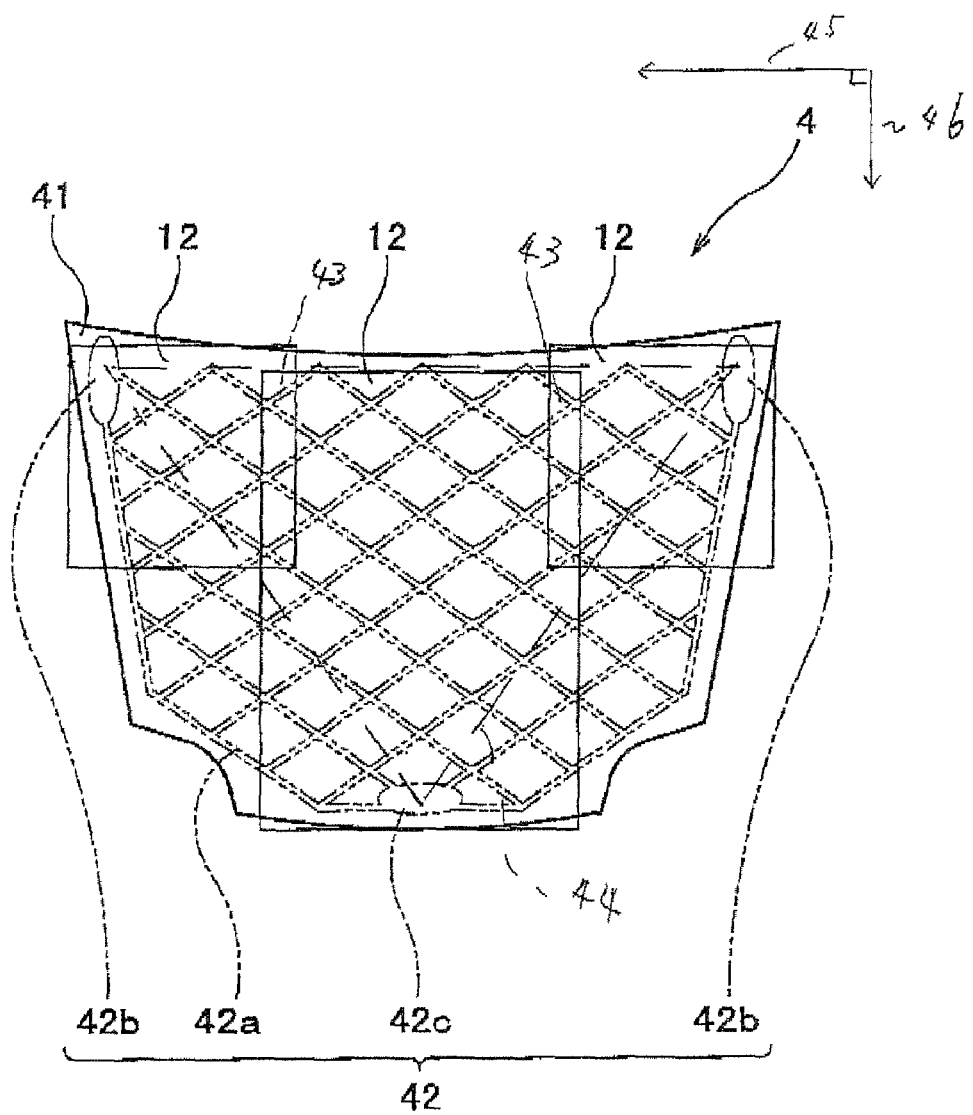
FIG. 5 is a bottom view showing a rib and the like formed on the backside of the hood shown in FIG. 4.

An example of the carbon fiber reinforced composite material 1 is described, which is applied to the hood or bonnet of a vehicle. FIG. 4 is an exploded perspective view showing a hood to which a carbon fiber reinforced composite material shown in FIG. 1 is applied. FIG. 5 is a bottom view showing a rib formed on the backside of hood.

As shown in FIG. 4, the semi-finished long-fiber stack 11 is formed into a flat portion 41 to serve as a hood 4. As shown in FIG. 5, the short-fiber base materials 12 are laid out so as to form shaping portions 42, which have more complex shapes than that of the flat portion 41. The shaping portions 42 include a rib 42a to reinforce the flat portion 41, attachment bosses 42b and a hook 42c to hold the hood 4.

It may be possible to form the short-fiber base materials 12 in any shape as long as an enough amount is prepared for forming the shaping portions 42. For example, it may be possible to select a shape substantially the same as that of the hood 4 as shown in FIG. 4 or a simple rectangular shape as shown in FIG. 5. If rectangular shapes are selected for the short-fiber base materials 12, it may be possible to acquire desirable stiffness by placing at least three sheets of them with overlapping parts 43 so that they can be spread over the triangular area (polygonal area) 44 defined by the three points, the two of bosses 42b and the hook 42c, because the rib 42a is accordingly adjusted to cover this triangular area 44. In this way, if the short-fiber base materials 12 having the simple rectangular shapes are appropriately placed as described above, it may be possible not only to acquire the sufficient stiffness of hood 4 but also to improve a yield as a result of saving raw material compared with complex shapes. A plurality of the sheets (base materials 12) are arranged in a first direction 45 and sizes of the sheets in a second direction 46 perpendicular to the first direction 45 are determined so as to cover the triangular area 44. The overlapping parts 43 each cross the triangular area 44 from one edge (one side) to an adjacent edge (adjacent side) of the trangular area 44.

When the semi-finished long-fiber stack 11 and the short-fiber base materials 12 are pressed and heated in the mandrel apparatus 3, the flat portion 41 with high in-plane stiffness and the rib 42a to reinforce its out-of-plane stiffness are integrally formed, so that the hood 4 can have high stiffness in all directions.

Although description has been made for the hood 4, to which the carbon fiber reinforced composite material 1 is applied, it is not limited to this example but its application to other components may be possible as long as they have a flat portion and a shaping portion which is more complicated than the flat portion.

What is claimed is:

1. A molded product of fiber reinforced composite material plate including holding parts defining a triangular area on a surface of said fiber reinforced composite material plate, comprising:
   a substantially flat portion; and
   a shaping portion which is molded to be more complex in shape than the substantially flat portion,
   wherein the substantially flat portion includes a first parent material and a reinforcing material made of long-fiber sheet,
   wherein the shaping portion includes a second parent material and a plurality of sheets including short fibers, each having an area smaller than the triangular area, and
   wherein the sheets cover the triangular area, and each of the sheets includes an overlapping part overlapping with an adjacent sheet within the triangular area.

2. The molded product of fiber reinforced composite material according to claim 1, wherein the shaping portion is molded into a rib for reinforcing the substantially flat portion.

3. The molded product of fiber reinforced composite material plate according to claim 1, wherein the sheets have rectangular shapes.

4. The molded product of fiber reinforced composite material plate according to claim 1, wherein two of the holding parts comprise holding bosses.

5. The molded product of fiber reinforced composite material plate according to claim 1, wherein one of the holding parts comprises a hook.

6. The molded product of fiber reinforced composite material plate according to claim 1, wherein the molded product has an outside area outside the triangular area, and the outside area has an area not covered by a short-fiber sheet.

* * * * *